United States Patent [19]

Niemeier et al.

[11] Patent Number: 5,383,690
[45] Date of Patent: Jan. 24, 1995

[54] ARRANGEMENT FOR FASTENING A FLUID LINE TO A BODY PARTICULARLY A FUEL FILTER FOR AN INTERNAL COMBUSTION ENGINE

[75] Inventors: Gerd Niemeier, Stuttgart; Frank Schneider, Filderstadt, both of Germany

[73] Assignee: Mercedes-Benz AG, Stuttgart, Germany

[21] Appl. No.: 94,519

[22] Filed: Jul. 19, 1993

[30] Foreign Application Priority Data

Aug. 25, 1992 [DE] Germany .................. 4228155

[51] Int. Cl.⁶ .............................. F16L 39/00
[52] U.S. Cl. .................. 285/137.1; 285/194; 285/202; 285/203; 285/205; 285/420; 403/186
[58] Field of Search ............ 285/137.1, 194, 202, 285/203, 204, 205, 420; 403/186

[56] References Cited

U.S. PATENT DOCUMENTS

| 858,699 | 7/1907 | Bossert | 285/194 |
|---|---|---|---|
| 1,875,209 | 8/1932 | Baldwin, Jr. | 285/205 |
| 2,034,559 | 3/1936 | Brunner | 285/205 |
| 2,459,752 | 1/1949 | Wilson et al. | 285/205 |
| 3,134,888 | 5/1964 | Ammerman | 285/205 |
| 3,929,356 | 12/1975 | DeVincent et al. | 285/305 |
| 5,180,005 | 1/1993 | Marsais | 285/205 |

FOREIGN PATENT DOCUMENTS

| 0046223 | 2/1982 | European Pat. Off. |
|---|---|---|
| 2634270 | 1/1990 | France . |
| 2849133 | 5/1980 | Germany . |
| 3925293 | 2/1991 | Germany . |
| 205746 | 10/1923 | United Kingdom . |
| 393994 | 6/1933 | United Kingdom . |
| 2108617 | 5/1983 | United Kingdom . |

OTHER PUBLICATIONS

Mercedes–Benz, Type OM615 Spare Parts List, Edition C, Apr. 1971.

*Primary Examiner*—Richard A. Bertsch
*Assistant Examiner*—Howard R. Richman
*Attorney, Agent, or Firm*—Klaus J. Bach

[57] ABSTRACT

In an arrangement for fastening at least one fluid line to a body, in particular a fuel filter for an internal combustion engine wherein the body has a bore and the fluid line includes a cylindrical connecting piece received and locked in the bore, the connecting piece is configured as a plug-in unit provided with a stop collar bearing against the body when the connecting piece is fully inserted in the receiving bore and a mounting plate is detachably connected to the body and has a portion overlaying the stop collar for locking the connecting piece in the receiving bore when the mounting plate is connected to the body.

5 Claims, 1 Drawing Sheet

U.S. Patent        Jan. 24, 1995        5,383,690
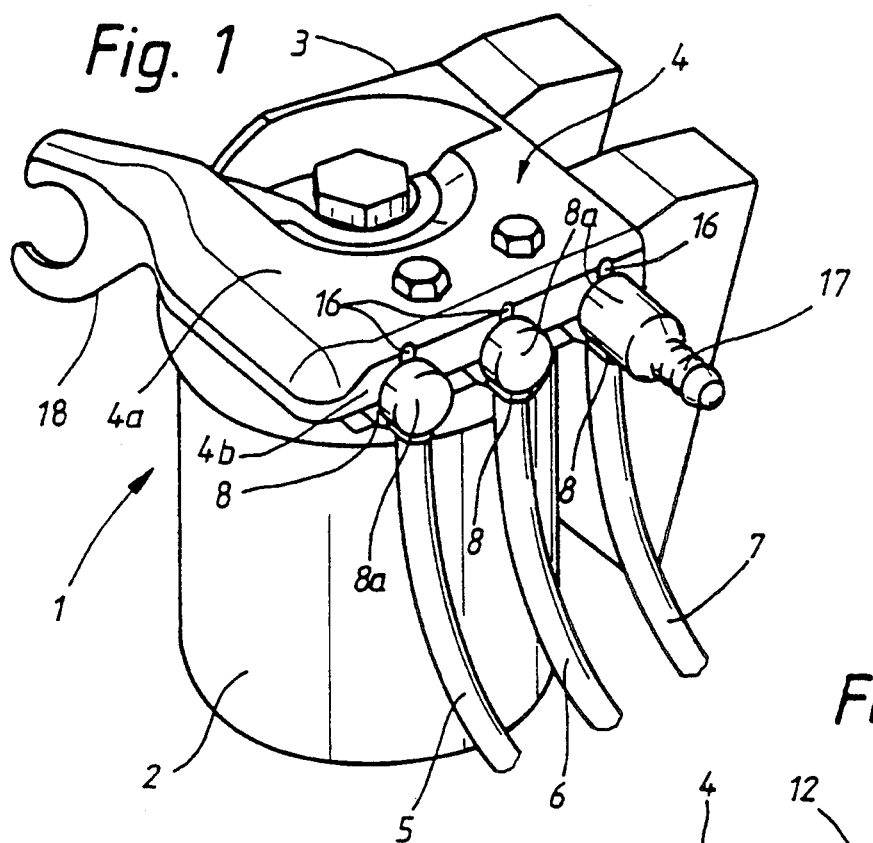
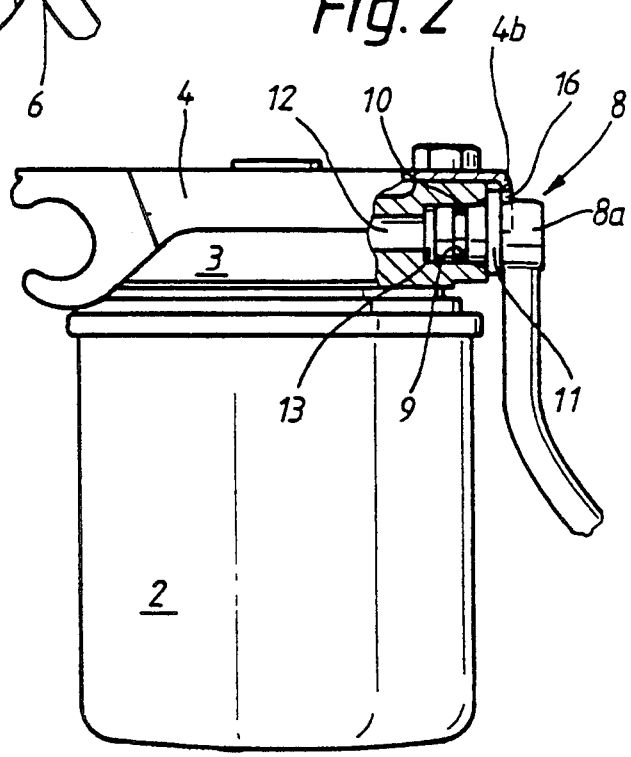
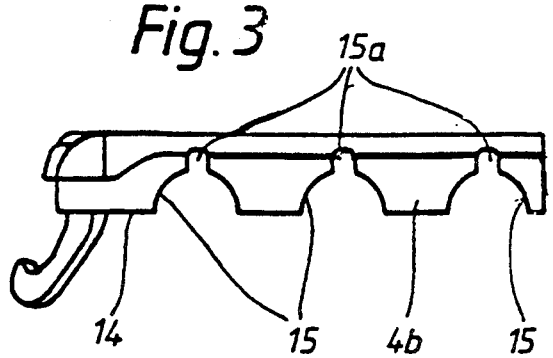

ARRANGEMENT FOR FASTENING A FLUID LINE TO A BODY PARTICULARLY A FUEL FILTER FOR AN INTERNAL COMBUSTION ENGINE

BACKGROUND OF THE INVENTION

The invention relates to an arrangement for fastening at least one fluid line to a body, in particular a fuel filter for an internal combustion engine, which facilitates assembly of the body with the fluid line.

From the printed publication "Mercedes-Benz Type OM 615, Engine Spare Parts List". Issue C of April 1971, an arrangement is known for fastening a pipe to a fuel filter, the filter head of which includes three adjacently disposed connections for supply and delivery pipes. The pipes are provided at their ends with cylindrical pieces which are fastened to the filter head by means of hollow screws and sealed by seal rings.

The object of the invention is to provide a simple fastening arrangement which enables pipes to be rapidly fitted and, in an arrangement of a plurality of adjacently disposed pipes, allows fitting to be carried out in very tight spaces.

SUMMARY OF THE INVENTION

In an arrangement for fastening at least one fluid line to a body, in particular a fuel filter for an internal combustion engine wherein the body has a bore and the fluid line includes a cylindrical connecting piece received and locked in the bore, the connecting piece is configured as a plug-in unit provided with a stop collar bearing against the body when the connecting piece is fully inserted in the receiving bore and a mounting plate is detachably connected to the body and has a portion overlaying the stop collar for locking the connecting piece in the receiving bore when the mounting plate is connected to the body.

Fastening of the pipe to the body can be realized in an extremely simple and rapid manner without any aids. The connecting piece, which is configured as a plug-in unit and includes a stop collar, is plugged into the receiving bore of the body as far as the stop permits and the mounting plate engaging the stop collar is then fastened to the body. This type of fastening additionally offers the advantage that it is extremely space-saving and particularly suitable for mounting a plurality of pipes which are disposed closely together and which, with the arrangement according to the invention, can be accommodated without interfering with one another.

The connecting pieces are secured in the receiving bores in axial direction. Means may also be provided which secure the connecting pieces in the receiving bores in a predetermined orientation.

BRIEF DESCRIPTION OF THE DRAWINGS

FIG. 1 shows, in perspective view, a fuel filter to which three pipes are fastened;

FIG. 2 shows the pipe fastening arrangement in cross-section; and

FIG. 3 is a view of a locking plate for retaining a plurality of pipes.

DESCRIPTION OF A PREFERRED EMBODIMENT

As shown in FIG. 1, a fuel filter 1 for an internal combustion engine comprises a filter box 2 and a filter head 3. A mounting plate 4, which is essentially formed to fit the shape of the filter head 3, is screwed to the filter head 3 and serves as a base for the mounting of fuel pipes.

The ends of the pipes 5, 6, 7 are provided with cylindrical connecting pieces 8, which are configured as plug-in units and which have, as can be seen from FIG. 2, annular grooves 9 with sealing rings 10 and stop collars 11.

The connecting piece 8 is inserted up to the stop into a receiving bore 13 which is provided in the filter head 3 and is in communication with a fuel passage 12. The stop collar 11 bears against the aperture rim of the receiving bore 13.

The mounting plate 4 is bent on the pipe end at right angles so as to form an upper plate portion 4a which is screwed onto the filter head 3 and a downwardly bent plate portion 4b which has at the plate edge 14 recesses 15 (FIG. 3), which are approximately semicircular with a radius corresponding to that of the connecting pieces 8.

The mounting plate 4 overlays, with its plate edge 14, the stop collars 11 of the connecting pieces 8 for locking the connecting pieces 8 in place in the receiving bores 13 in a simple manner.

The recesses 15 of the plate edge 14 further have cut-outs 15a, which are located at the highest point of the recesses 15. Reaching into these cut-outs 15a are correspondingly configured projections 16 which are integral with the outer cylinder parts 8a of the connecting pieces 8. As shown in FIG. 2, they are disposed directly adjacent the stop collar 11. As a result of their engagement with the plate portion 4a, rotation of the connecting pieces is prevented and the pipes 5, 6, 7 are retained in the receiving bores 13 in their design orientation.

The cylinder parts 8a of the connecting pieces 8 and pipes 5, 6, 7 are interconnected at right angles relative to each other. As a result of the special predetermined positioning of these pipes, an orderly pipe arrangement is always obtained. The pipe denoted by numeral 6 is a fuel supply pipe, the pipe denoted by numeral 5 is a pipe originating from a feed pump and the pipe denoted by numeral 7 is a return pipe from a fuel injection pump. The connecting piece of this return pipe is provided with a connecting socket 17 for a return hose which is not shown in FIG. 1.

The mounting plate 4 can further include at least one retaining bracket 18 for locating another hose or pipe in the engine compartment.

What is claimed is:

1. An arrangement for fastening at least one fluid line to a fuel filter for supplying fuel thereto, said fuel filter including a filter head and a filter box, said filter head having a receiving bore at one side thereof and said fluid line having a cylindrical connecting piece received and locked in said receiving bore, said cylindrical connecting piece being configured as a plug-in unit and provided with a stop collar which bears against said filter head when said connecting piece is fully inserted into said receiving bore and a mounting plate detachably connected to said filter head and having a portion bent at a right angle so as to form a plate portion which is screwed to said fuel filter head and a bent-over plate portion which extends along said one side of the filter head and over said connecting piece thereby overlaying said stop collar so as to safely lock said cylindrical connecting piece axially within said receiving bore.

2. An arrangement according to claim 1, wherein said mounting plate has formed at its plate edge a recess receiving said connecting piece so as to partially enclose said connecting piece.

3. An arrangement according to claim 2, wherein said recess has, at a predetermined location, a cut-out receiving a projection extending radially from said connecting piece for locking said connecting piece in a predetermined orientation.

4. An arrangement according to claim 1, wherein a plurality of fluid lines with a plurality of connecting pieces are mounted in the filter head, and said mounting plate is provided with a number of recesses, each with a cut-out, corresponding to the number of connecting pieces.

5. An arrangement according to claim 4, wherein said connecting pieces and fluid lines extend at a right angle with respect to one another.

* * * * *